(12) United States Patent
Hanaoka et al.

(10) Patent No.: US 7,363,007 B2
(45) Date of Patent: Apr. 22, 2008

(54) ADAPTIVE MODULATION/DEMODULATION METHOD AND RADIO COMMUNICATIONS SYSTEMS

(75) Inventors: Seishi Hanaoka, Tokyo (JP); Satoshi Tamaki, Kokubunji (JP); Takashi Yano, Tokorozawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 581 days.

(21) Appl. No.: 10/894,062

(22) Filed: Jul. 20, 2004

(65) Prior Publication Data

US 2005/0054302 A1    Mar. 10, 2005

(30) Foreign Application Priority Data

Sep. 10, 2003    (JP) .............................. 2003-317707

(51) Int. Cl.
*H04B 7/00*    (2006.01)
(52) U.S. Cl. .................. 455/44; 455/17; 370/206; 370/207; 370/465; 375/261; 375/298
(58) Field of Classification Search ............... 455/17, 455/44; 370/206, 207, 465, 20; 375/261, 375/298
See application file for complete search history.

(56) References Cited

U.S. PATENT DOCUMENTS 6,359,934 B1* 3/2002 Yoshida ...................... 375/262
6,738,646 B2* 5/2004 Miyoshi et al. ............. 455/561
2004/0203992 A1* 10/2004 Yun ........................... 455/522

FOREIGN PATENT DOCUMENTS

| WO | WO 00/62498 | 10/2000 |
| WO | WO 01/08369 | 2/2001 |
| WO | WO 02/091695 | 11/2002 |

OTHER PUBLICATIONS

Shinya Otsuki, "Performance of Modulation Level Controlled Adaptive Modulation Systems" (Electronic Information Society Journal B-II, vol. J78-B-II No. 6, pp. 435-444, Jun. 1995).

* cited by examiner

*Primary Examiner*—Quochien B. Vuong
*Assistant Examiner*—Fayyaz Alam
(74) *Attorney, Agent, or Firm*—Antonelli, Terry, Stout & Kraus, LLP.

(57) ABSTRACT

Adaptive modulation/demodulation method in a radio communication system is provided. A modulation multi-level number in a transmission device and a demodulation multi-level number in a reception device are judged independently from each other according to a propagation condition and communication is performed by controlling the likelihood when the multi-level numbers of the transmission side and the reception side are different. The reception device can perform operation by controlling likelihood information on lower bit of the multi-level modulation even when the modulation multi-level number and the demodulation multi-level number used at the transmission side are different. Moreover, the transmission device and the reception device independently decide the modulation multi-level number and the demodulation multi-level number, thereby following an instantaneous propagation fluctuation and improving the throughput.

14 Claims, 15 Drawing Sheets

ADAPTIVE MODULATION/DEMODULATION METHOD AND RADIO COMMUNICATIONS SYSTEMS

BACKGROUND OF THE INVENTION

The present invention relates to a multi-level modulation/demodulation method used in a transmission/reception device used especially in a radio communication system.

FIG. 2 shows a concept of the conventional adaptive modulation method. The adaptive modulation method enables a high throughput by controlling the modulation multi-level number according to the propagation condition such as 64 QAM (Quadrature Amplitude Modulation) (204) when the propagation condition is good, QPSK (Quadrature Phase Shift Keying) (202) when the propagation condition is not good, and otherwise, 16 QAM (203). This method is introduced in an article, Shinya OTSUKI et al "Performance of Modulation Level Controlled Adaptive Modulation Systems" (Electronic Information Communication Society Journal B-II, Vol. J78-B-II No. 6 pp. 435-444., June 1995).

FIG. 3 shows the system configuration of this adaptive modulation method. In a communication device (301) of the transmission side, data to be transmitted is encoded by a coding block. In the radio communication, the convolution coding and the turbo coding are often used as the coding method. However, the coding method is not to be limited to these but other coding methods can also be applied. The coded word which has been coded is input to a QAM (Quadrature Amplitude Modulation) adaptive modulation block (304) and modulated. The baseband signal after the modulation is converted to a radio frequency band by a radio frequency block (305) and transmitted. On the other hand, in a radio communication device (302) of the reception side, the radio signal received via an antenna is converted to a baseband by a radio frequency block (306). The baseband signal is firstly subjected to demodulation processing in a QAM demodulation block (307). The demodulation result (likelihood) subjected to soft decision is input a decoding block (308) and decoded in the decoding block (308).

Next, in this adaptive modulation method, the modulation multi-level number in the communication device of the transmission side should be matched with the demodulation multi-level number in the communication device of the reception side. More specifically, the modulation multi-level number m in the QAM adaptive modulation block (304) of the communication device (301) of the transmission side is decided as follows. Firstly, the propagation condition at the time immediately before the demodulation performed by the reception device (302) (or before the present) is measured by using an S/N measurement block (309). Next, an S/N information creation block (310) creates a signal for transmitting this measurement result from the reception device (302) to the transmission device (301). The information created is modulated in the modulation block (312) and transmitted. The transmission device (301) demodulates this reception signal in the decoding block (313) and acquires the propagation condition such as the S/N information. The propagation condition is judged (316) according to the acquired S/N information and the like. If the propagation condition is good, modulation is performed by multi-level modulation with a large multi-level number, and if the propagation condition is not good, modulation is performed by multi-level modulation with a small multi-level number (304). This series of control is closed as a system, i.e., a feedback system, as shown in (317). It should be noted that in FIG. 3 and after, an example of control of the multi-level number is described in one of the links (for example, downlink) but it can also be applied to the other link (uplink).

As shown in FIG. 3, this adaptive modulation method performs high-speed processing of multi-level number control by the feedback system by following the propagation fluctuation and accordingly, there arises a problem that the feedback information (310) is not coded sufficiently and the characteristic is degraded if this information is erroneously judged due to the noise in the transmission device (301). Moreover, since this adaptive modulation method switches the multi-value numbers by using the feedback system, it is difficult to perform the multi-level number control in a unit shorter than the time required for the feedback. More specifically, as shown in FIG. 4, when the time required for the feedback is (402), if a propagation fluctuation (401) faster than the control cycle (update cycle) occurs, the propagation condition cannot be followed and there is a problem that the characteristic is degraded because transmission is performed with a high multi-level number when the propagation condition is not good and on the contrary, transmission is performed with a low multi-level number when the propagation condition is good. Furthermore, when the adaptive modulation is applied to carriers of the communication method performing simultaneous communication by using a plurality of carriers such as the OFDM (Orthogonal Frequency Division Multiplexing), the feedback information increases in proportion to the number of carriers and there arises a problem that the processing amounts at the transmission device and the reception device become significantly great.

SUMMARY OF THE INVENTION

Since the conventional adaptive modulation method constitutes a feedback system, there is a problem that when an error is caused in the control information by the noise or the like, transmission is not performed with a correct modulation multi-level number in accordance with the propagation condition and the characteristic is degraded.

Moreover, since the conventional adaptive modulation method constitutes a feedback system, there is a problem that it is not possible to follow a propagation fluctuation faster than the time (control cycle) required for the feedback.

Moreover, since the conventional adaptive modulation method constitutes a feedback system, there is a problem that when performing simultaneous communication by using a plurality of keys such as OFDM, feedback information is required for each of the carriers and the signal processing amount at the transmission side device and the reception side device is increased in proportion to the number of carriers. As a result, the device size is increased, or the device operation speed should be increased, or the device power consumption is increased.

In order to solve the aforementioned problems, no feedback system is composed between the transmission device and the reception device but each of the transmission device and the reception device independently judges the propagation condition and decides the multi-level number.

Moreover, in order to solve the aforementioned problems, the transmission device and the reception device do not perform modulation or demodulation with the same modulation multi-level number at the same time but perform transmission with a combination of different modulation multi-level numbers according to the propagation condition and time.

Moreover, in order to solve the aforementioned problems, when the transmission device and the reception device are assumed to be performing communication with different modulation multi-level numbers, a low likelihood is set for the least significant bit of the multi-level modulation which can be demodulated in the reception device and this is made as a soft decision output result.

By controlling the likelihood information on the least significant bit of the multi-level modulation, the reception device according to the present invention can operate even when the demodulation multi-level number is different from the modulation multi-level number used at the transmission side.

Moreover, each of the transmission device and the reception device according to the present invention independently decides the modulation multi-level number and demodulation multi-level number. Accordingly, there is no need of constituting the feedback system and it is possible follow an instantaneous propagation fluctuation and improve the throughput.

Other objects, features and advantages of the invention will become apparent from the following description of the embodiments of the invention taken in conjunction with the accompanying drawings.

DETAILED DESCRIPTION OF EMBODIMENTS

Description will now be directed to a first embodiment of the present invention.

Figure 1:
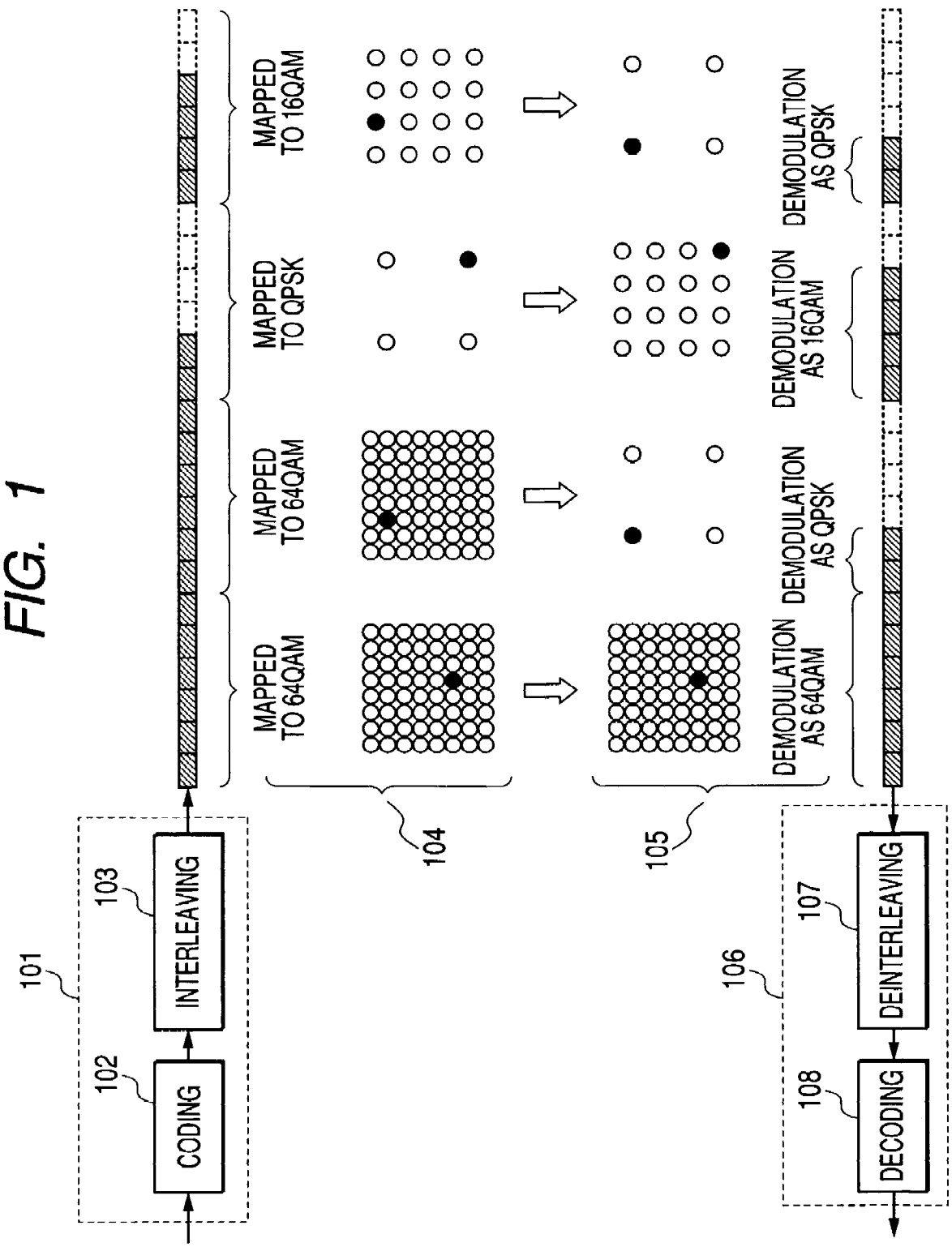
FIG. 1 shows a concept of an adaptive modulation/demodulation method according to the present invention.
Figure 2:
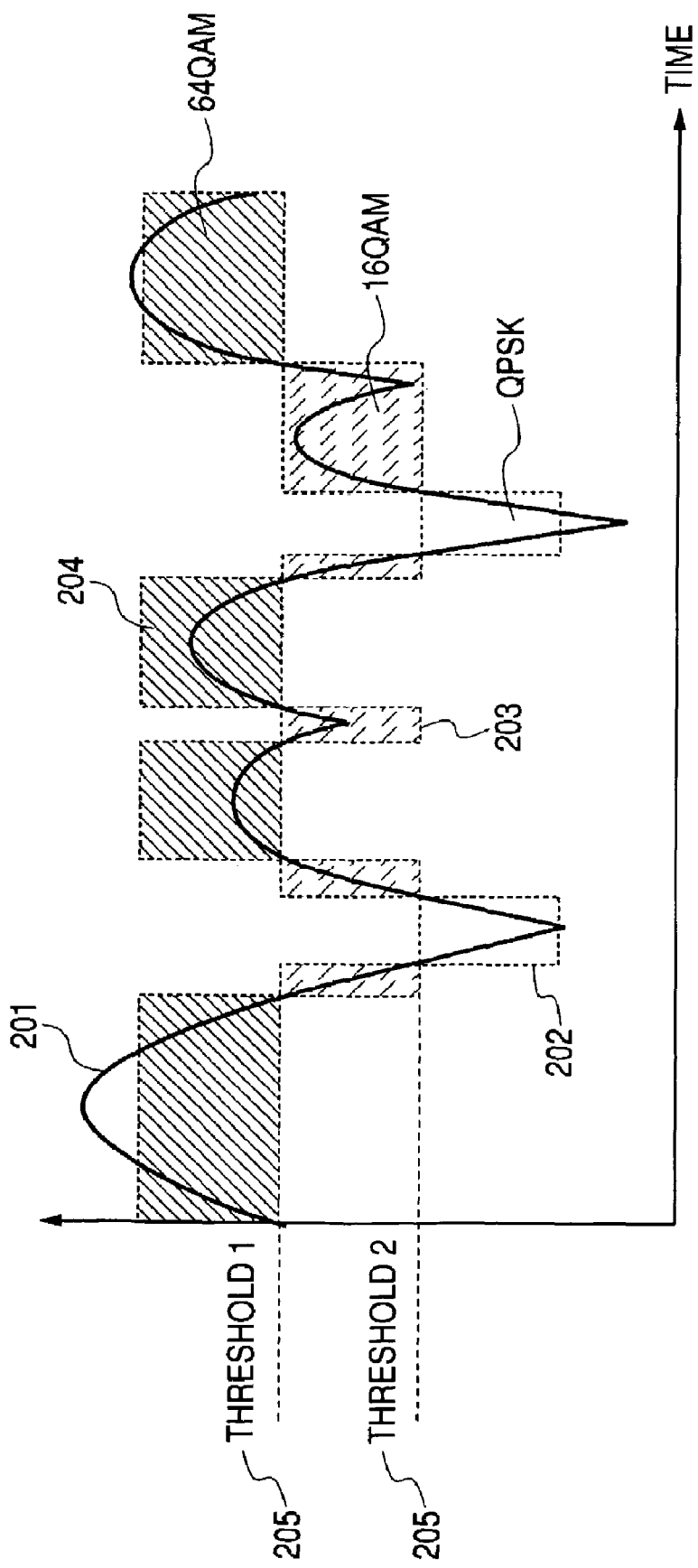
FIG. 2 shows a concept of a conventional adaptive modulation method.

Here, explanation will be given on an example of the maximum modulation multi-level number 64 QAM with reference to FIG. 1. However, the present invention can also be applied to multi-level modulation of other maximum multi-level numbers such as 256 QAM and 1024 QAM.

At the transmission device, firstly, transmission data is coded by a coding block (101). The coding includes coding (102) such as turbo coding and convolutional coding and interleave (103) for rearranging the data order at random. Next, according to the propagation condition, the interleaved data is mapped to the 64 QAM symbol, mapped to the QPSK symbol, symbol, or mapped to the 16 QAM symbol (104). The minimum cycle for switching the modulation method is one symbol time when assuming that the symbol speed is constant. However, a plurality of symbol times may also be used as switching units. The 64 QAM symbol can map 6 information bits to one symbol. However, the QPSK can map only 2 information bits to one symbol. Accordingly, the information amount that can be transmitted is decreased.

The reception device selects a multi-level number to be demodulated according to the propagation condition at the reception device and demodulates it regardless of the modulation multi-level number selected at the transmission device (105). In the example of FIG. 1, the first symbol demodulates by 64 QAM the signal modulated by 64 QAM, but the second symbol demodulates by QPSK the signal modulated by 64 QAM. Furthermore, the third symbol demodulates by 16 QAM the signal modulated by QPSK. Furthermore, the soft decision result after the demodulation is input to the decoding block (106) and subjected to deinterleave (107) and decoding (108) such as Viterbi decoding and turbo decoding so as to extract the transmitted data.

Here, with reference to FIG. 5, specific explanation will be given on the demodulation method when the modulation multi-level number m used in the transmission device is different from the demodulation multi-level number n used in the reception device.

Figure 5:
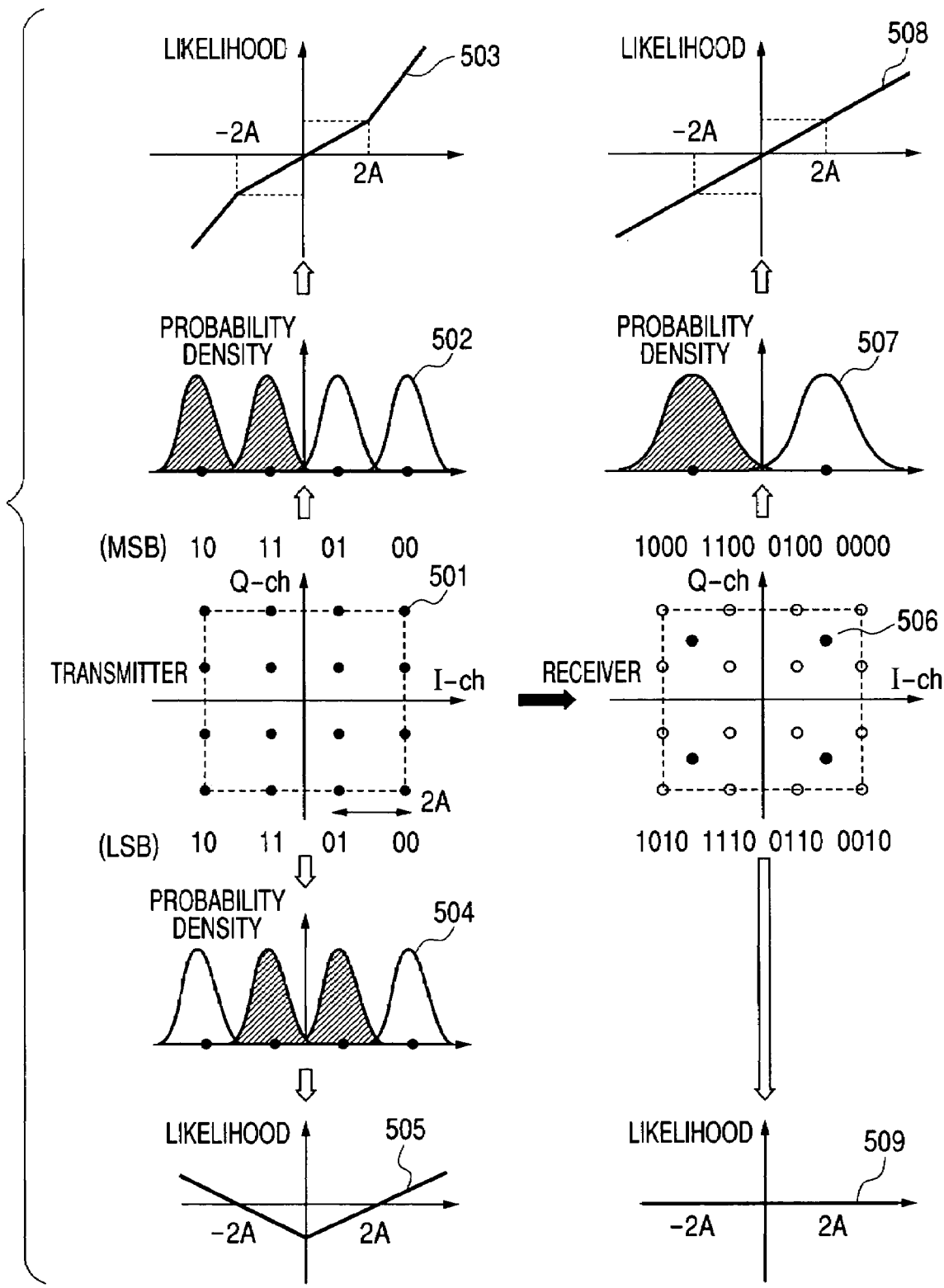
FIG. 5 shows a likelihood calculation method according to the present invention.

FIG. 5 shows the demodulation operation when demodulating the signal (501) which has been modulated by 16 QAM in the transmission device, by QPSK (506) in the reception device. Since the 16 QAM maps 4 information bits to one symbol, when attention is paid on the in-phase component (I-ch) of the 16 QAM modulation signal (501), 2 information bits are transmitted in the in-phase component and the probability distribution of its most significant bit (MSB) is such as shown in (502) that "0" is arranged on the signal point having a positive value of the in-phase component (value of the in-phase component>0) and "1" is arranged on the signal point having a negative value of the in-phase component (value of the in-phase component<0). Accordingly, in the conventional case demodulating this signal as the 16 QAM signal, the soft decision output as the likelihood given to the decoding block is the likelihood as shown in (503). In the case of the present invention demodulating this as the QPSK signal, although transmission is performed as the 16 QAM modulation signal, this is regarded as the QPSK signal. Accordingly, information on only the most significant one bit can be demodulated in this in-phase component and decision is performed assuming that the probability density follows (507). In this case also, "0" is arranged on the signal point having a positive value of the in-phase component (value of the in-phase component>0) and "1" is arranged on the signal point having a negative value of the in-phase component (value of the in-phase component<0). As shown in (508), the soft decision output as the likelihood given to the decoding block becomes a high likelihood in proportion to the distance from the boundary at the in-phase component value=0. On the other hand, when attention is paid on the least significant bit (LSB) of the 16 QAM modulation signal (501), as shown in (504), the probability distribution of the least significant bit is such that "0" is arranged on the signal point outside the 16 QAM of the in-phase component and "1" is arranged on the signal point inside 16 QAM. Accordingly, in the conventional case decoding this signal as the 16 QAM signal, the soft decision output as the likelihood given to the decoding block is the likelihood as shown in (505). In the case of the present invention decoding this as the QPSK signal, only information on the most significant one bit can be taken out into the in-phase component and valid likelihood information cannot be extracted by the lower bit operation. However, since the number of bits to be given to the decoding block should be identical, certain likelihood information should be output and information on low likelihood (that is, information that likelihood is low) is given. In the example of (5-9), for the least significant bit, the likelihood to be "0" and the likelihood to be "1" are identically low and "likelihood=0" is input as a demodulation result to the decoder.

By controlling the likelihood as has been described above, the operation can be performed even when the modulation multi-level number m used in the transmission device is different from the demodulation multi-level value n used in the reception device. That is, operation is enabled without performing control so that the transmission device and the reception device have the same modulation multi-level number. Such a communication method is called an adaptive modulation/demodulation method in this invention. It should be noted that explanation will be given below on the case that 1 information bit on the least significant bit cannot be acquired but the same control can be performed when the least significant two or more bits cannot be extracted. For example, when the propagation condition is not good and demodulation is performed as the QPSK signal though modulation has been performed by 64 QAM, the demodulation results "likelihood=0" are inputs for the least significant two bits to the decoder.

Figure 6:
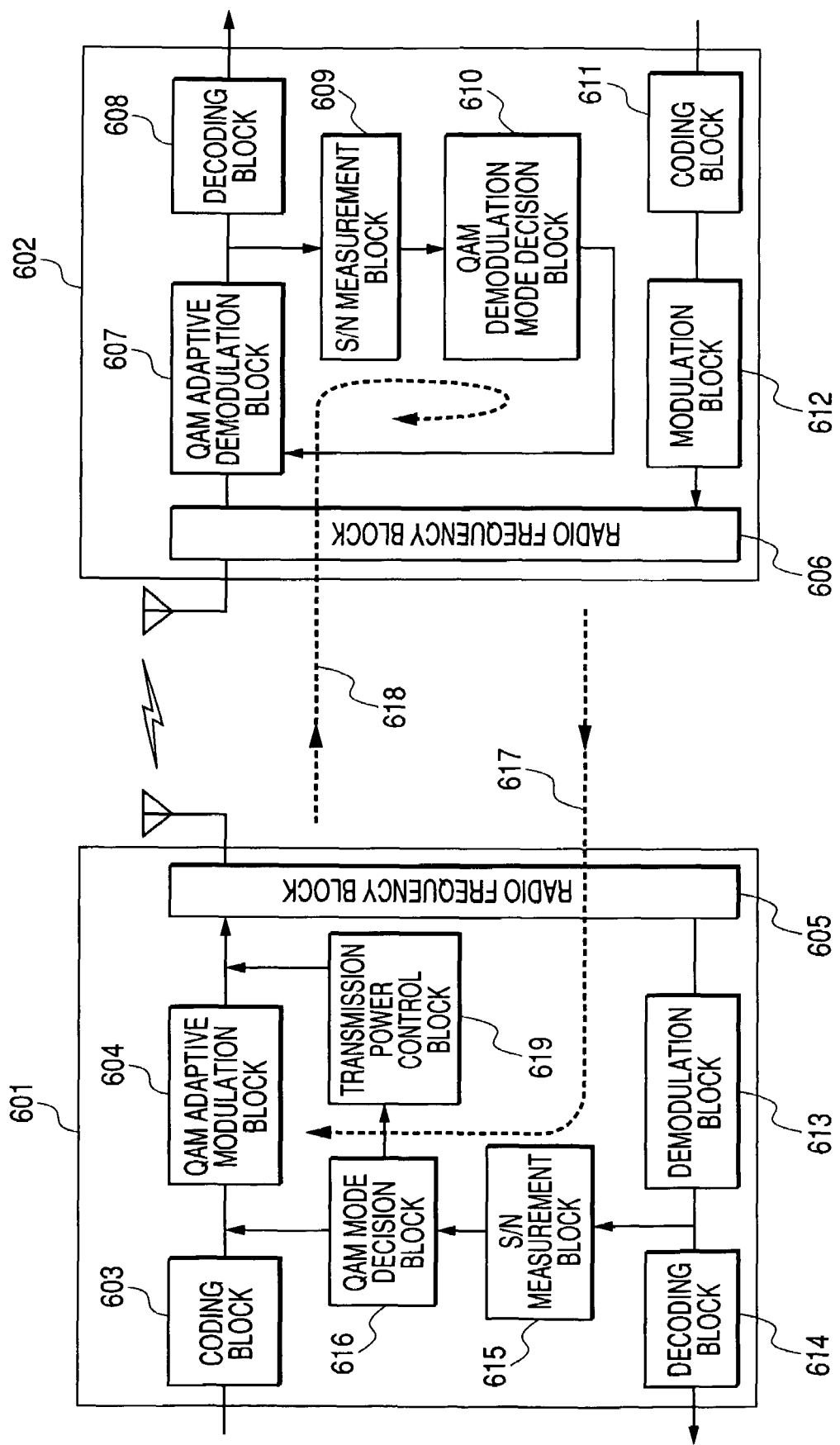
FIG. 6 shows a system configuration of the adaptive modulation/demodulation method according to the present invention.

FIG. 6 shows the system configuration of the present invention in this case.

In the transmission device (601), firstly, coding is performed in the coding block (603) and then modulation is performed in the QAM adaptive modulation block (604). Here, the signal (617) from the reception side transmission device is demodulated and the S/N is measured by the S/N measurement block (615), thereby estimating the propagation condition and judging the modulation multi-level number at the transmission device (616). In this embodiment the S/N is measured. However, a value other than this such as BER (Bit Error Rate), C/I, $E_b/N_0$, or the received power may be used for deciding the modulation multi-level number. The signal modulated is converted to a radio frequency band via the radio frequency block (605) and transmitted. At the reception device (60-2), the signal received by the radio frequency block (606) is converted to a baseband signal and demodulated by the QAM adaptive demodulation block (607). Here, the propagation condition such as the S/N of the received signal is measured (609) and the multi-level number to be decoded is judged (610) so as to perform demodulation by using the aforementioned likelihood control. The demodulation result is input to the demodulation block (608) and the original information decoded is extracted.

Figure 3:
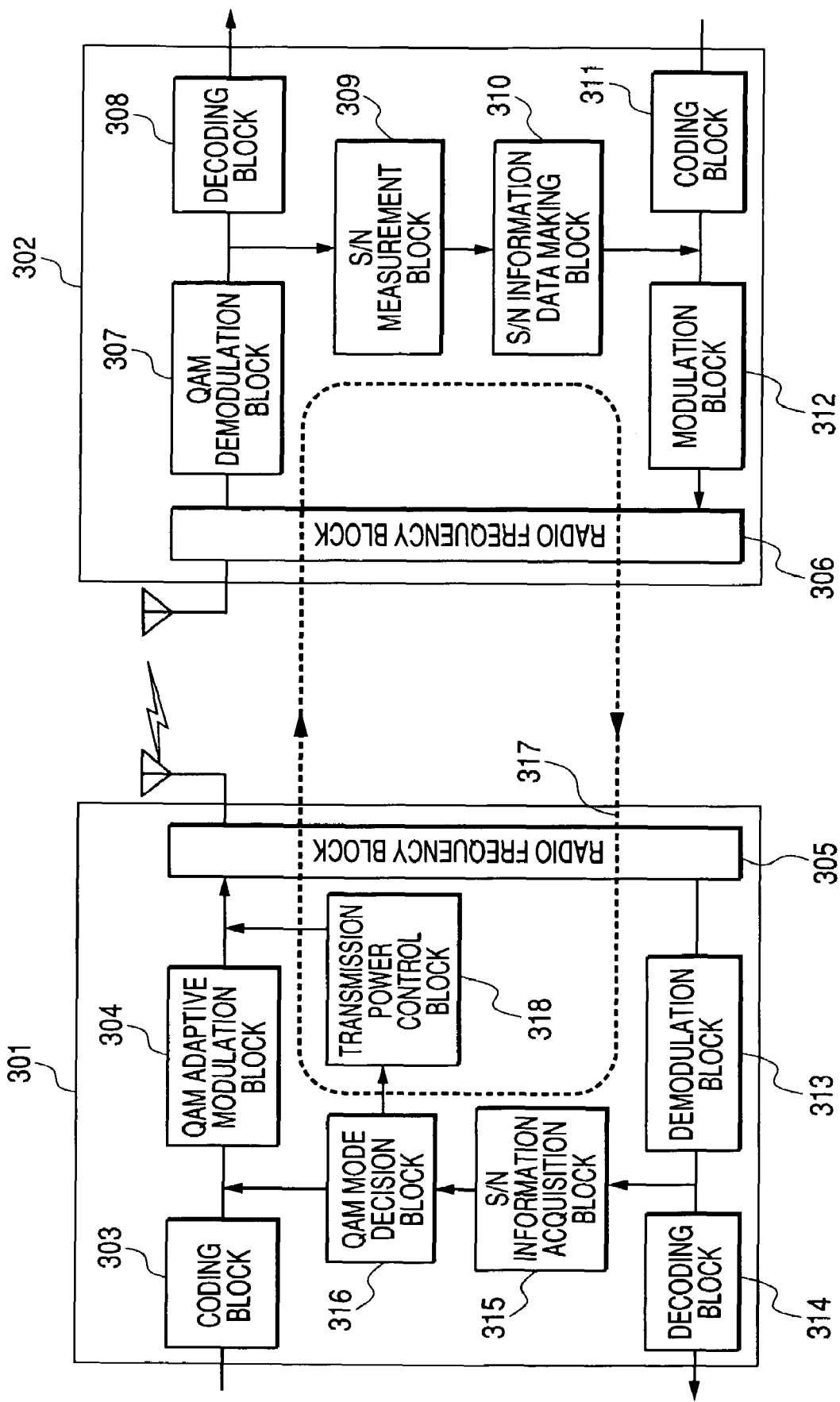
FIG. 3 shows a system configuration of the conventional adaptive modulation method.
Figure 4:
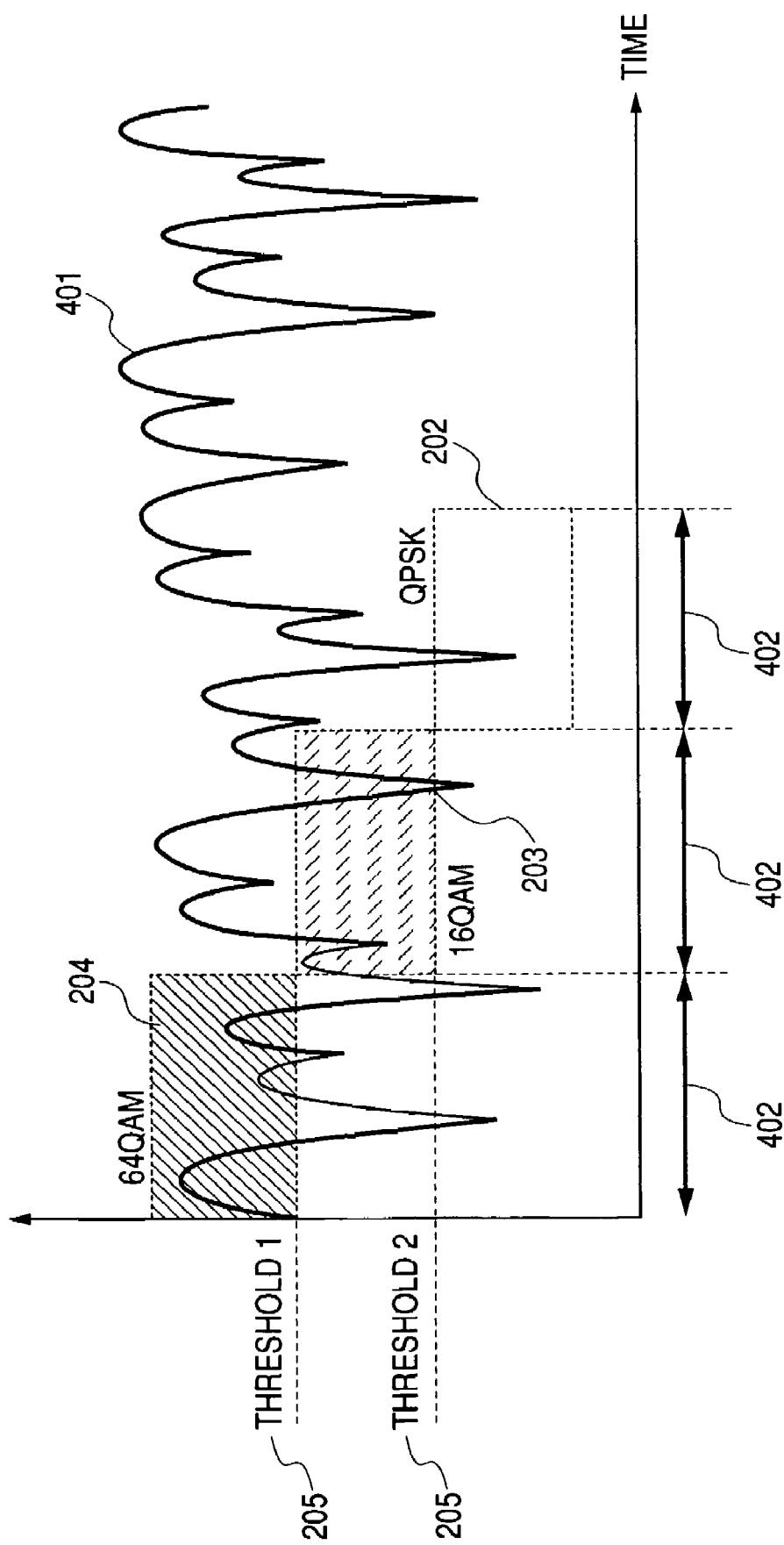
FIG. 4 shows a problem of the conventional adaptive modulation method.

What is important here is that the modulation multi-value number in the transmission device is decided by the signal (617) and the demodulation multi-value number in the reception device is decided by the signal (618). That is, unlike the control loop (317) in the adaptive modulation method described with reference to FIG. 3, the system configuration according to the present invention does not constitute the feedback system and each of the transmission device and the reception device independently decides the modulation multi-level number and the demodulation multi-level number.

Since it is possible to decide the modulation multi-level number and the demodulation multi-level number without constituting the feedback system, it is possible to follow the instantaneous propagation fluctuation.

Figure 7:
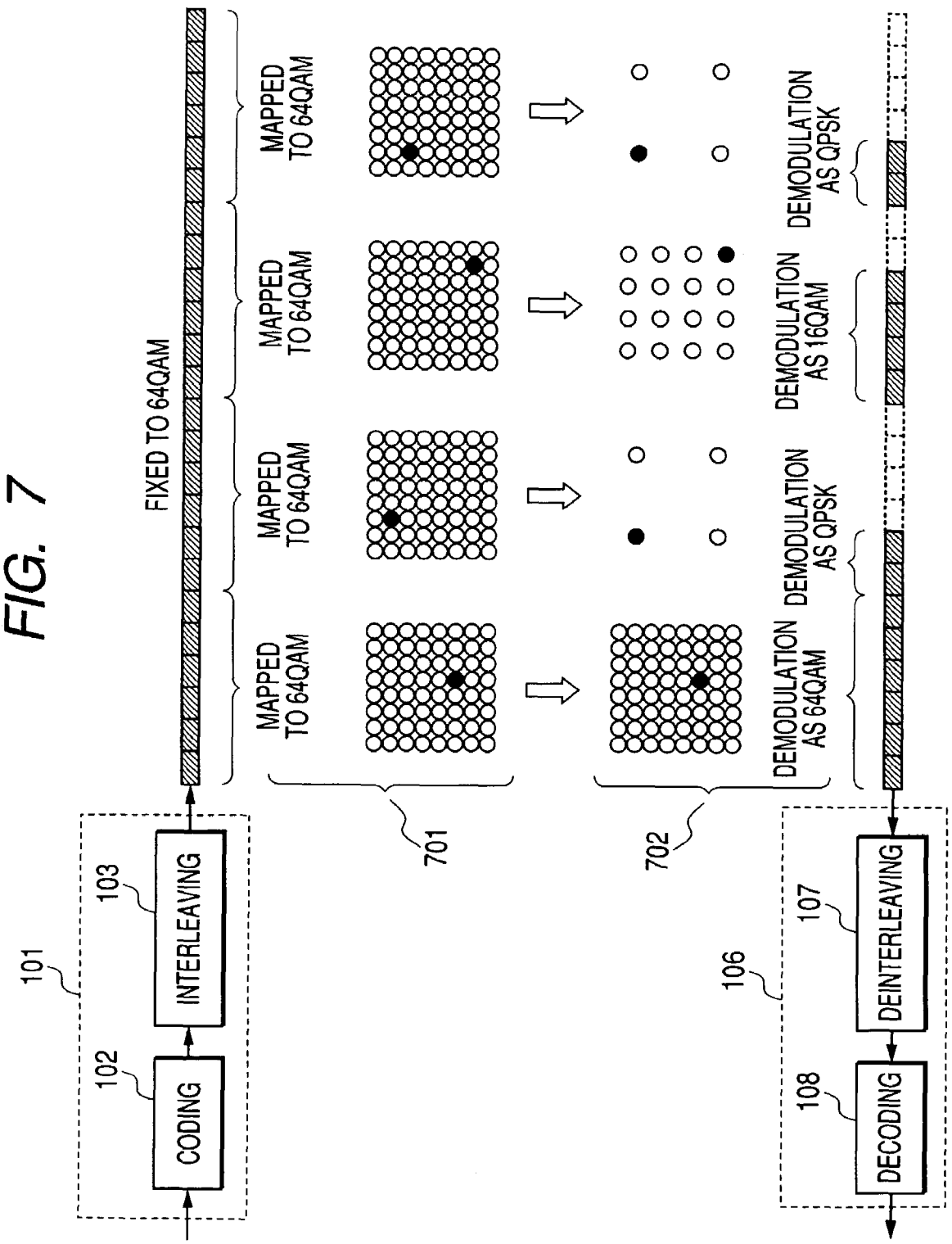
FIG. 7 shows a concept of the adaptive demodulation method according to the present invention.

Description will now be directed to a second embodiment of the present invention. In the first embodiment, each of the transmission device and the reception device independently decides the modulation multi-level number and the demodulation multi-level number according to the propagation condition and accordingly, there is a case of modulation multi-level number m<demodulation multi-level number n. In this case, when performing decoding, information on the information bit not transmitted from the transmission device is created from a reception signal by the likelihood control at the reception device and accordingly, the characteristic may be degraded. Consequently, in this embodiment, the propagation condition is measured before communication start and during communication and the modulation multi-level number at the communication start and during communication is agreed between the transmission device and the reception device. As shown in FIG. 7, the modulation multi-level number m in the transmission device is set to a great value in advance. The value of the modulation multi-level number m may vary during the communication but the demodulation multi-level number n in the reception device is always set to equal to or smaller than the modulation multi-level number m in communication, so that information on the information bit not transmitted will not be created, thereby suppressing the throughput characteristic degradation in the reception device.

Figure 15:
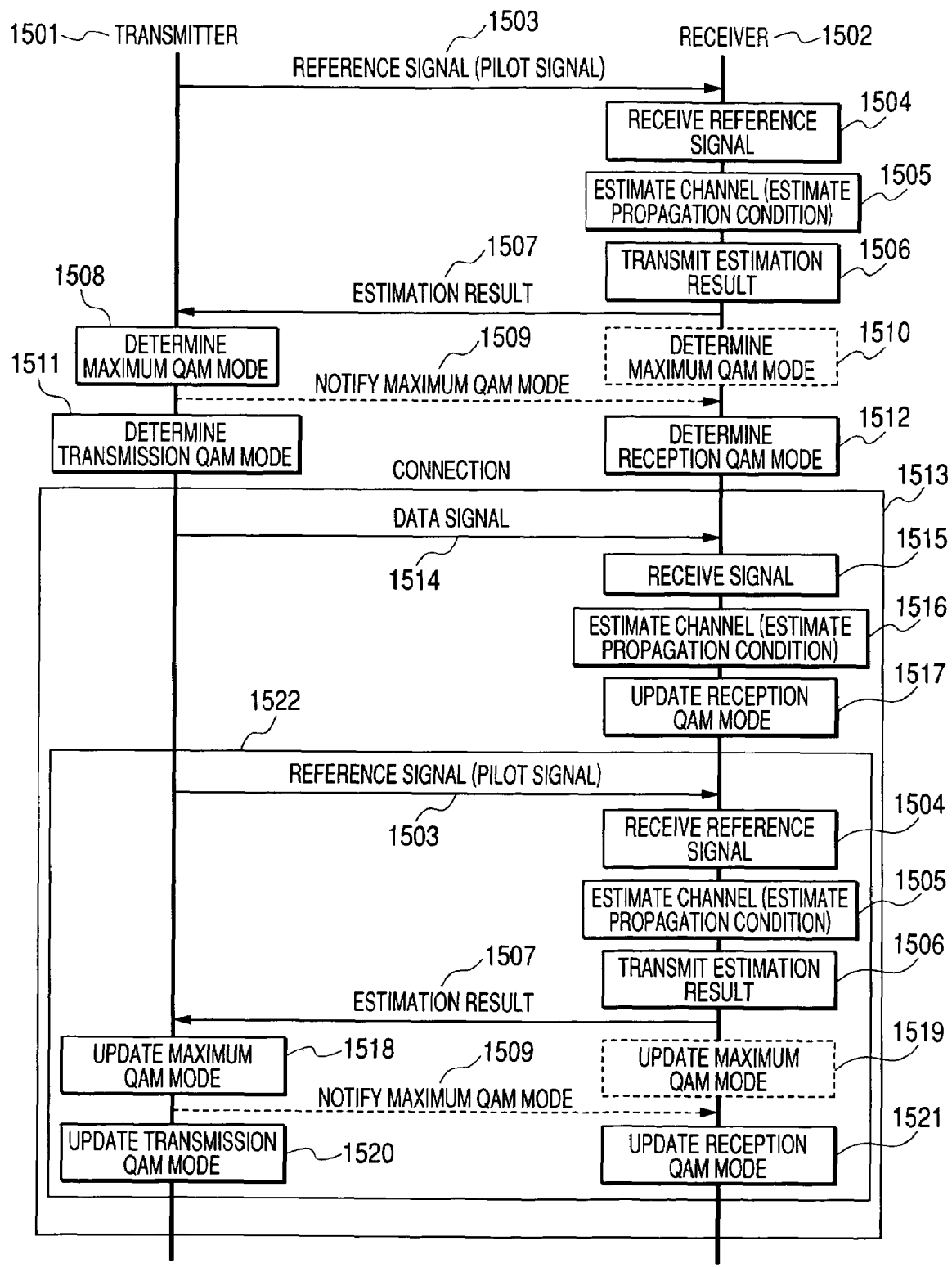
FIG. 15 shows a control flow of the adaptive demodulation method according to the present invention.

FIG. 15 shows a control flow of the modulation multi-level number in the second embodiment. In FIG. 15, the transmission device transmits a reference signal such as a pilot signal, which is received by the reception device so as to measure the propagation condition (1505). The measurement result is transmitted to the transmission device (1507), and the maximum modulation multi-level number in the transmission device is decided (1508). In order to share this information with the reception device, it is possible to notify the maximum multi-level number by using the control signal again (1509). However, the reception device may include an algorithm and a method for deciding the maximum multi-level number by the transmission device (1512). In this case, there is no need of notifying the maximum multi-level number. During communication, a data signal is transmitted by the multi-level number decided and as has been described above, the propagation condition is measured (1516) and the reception multi-level number is updated by the reception side (1517). Moreover, the modulation multi-level number used by the transmission device is updated according to the propagation condition with a slower period than the switching of the demodulation multi-level number at the reception device (1522). Measurement of the propagation condition using the pilot signal and decision/updating of the multi-level number can be performed when starting a communication or during the communication.

Figure 8:
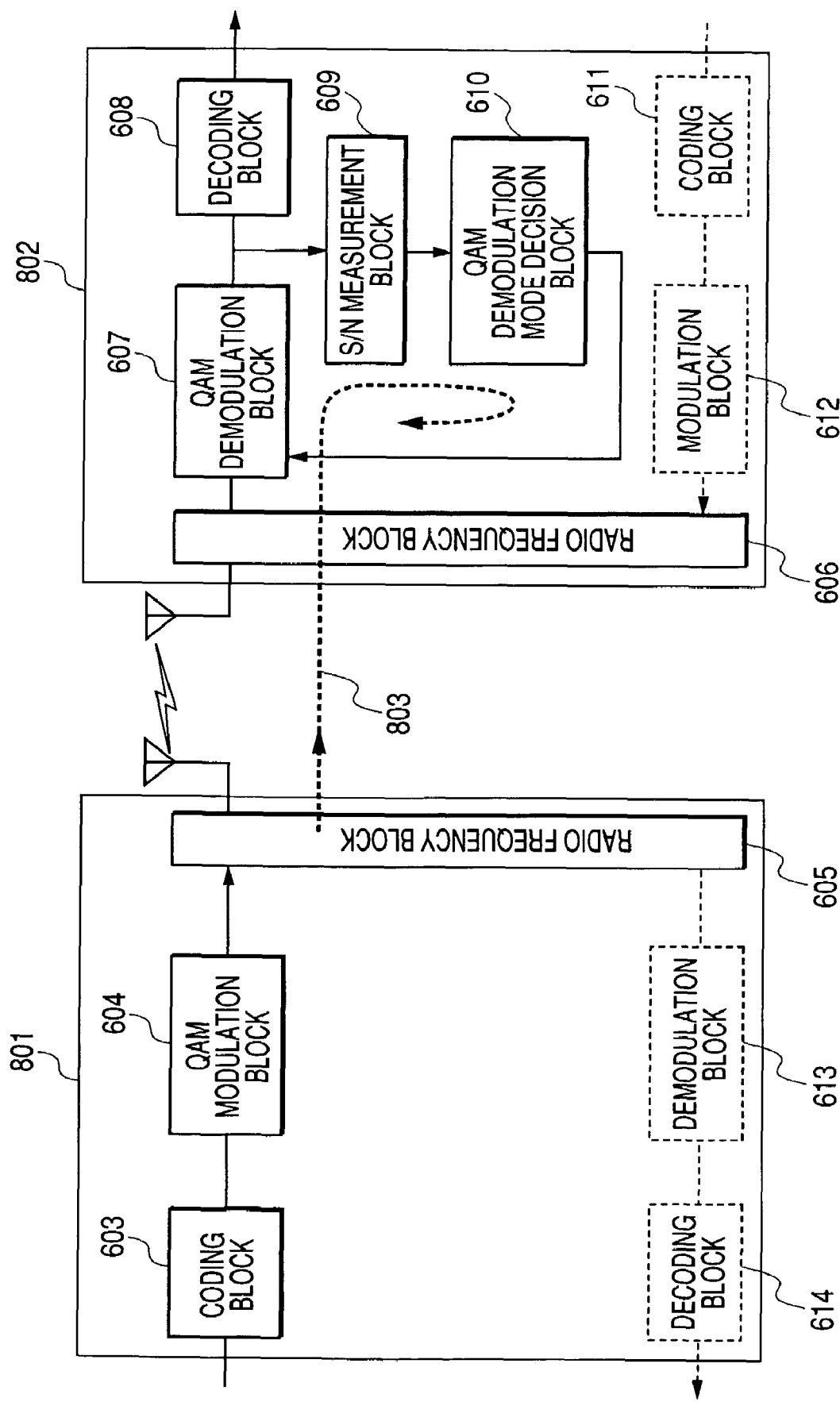
FIG. 8 shows a system configuration of the adaptive demodulation method according to the present invention.

Description will now be directed to a third embodiment of the present invention. As shown in FIG. 7, in this embodiment, the propagation condition is measured before starting communication and the modulation multi-level number upon communication start is agreed between the transmission device and the reception device. Moreover, the modulation multi-level number m at the transmission device is set to a higher value than the multi-level number judged according to the propagation condition before starting the communication. This is because there exists a probability that the propagation condition is more good than the moment when the decision is made by the propagation condition and in order to improve the throughput, transmission is performed in advance with a large multi-level number. Furthermore, the multi-level number m is fixed and not modified during the communication. FIG. 8 shows the system configuration in this case. In this case, the transmission device may be a conventional or existing communication device using the QAM modulation and only the reception device should be modified. In this case, only the demodulation adaptively controls the demodulation multi-level number and the control flow is as shown in (803). It should be noted that the communication method in this embodiment will be called an adaptive demodulation method. The control flow of the modulation multi-level number in the third embodiment correspond to FIG. 15 excluding a series of processes surrounded by (1522), i.e., the process (1522) for updating the modulation multi-level number used in the transmission device according to the propagation condition during communication.

Figure 9:
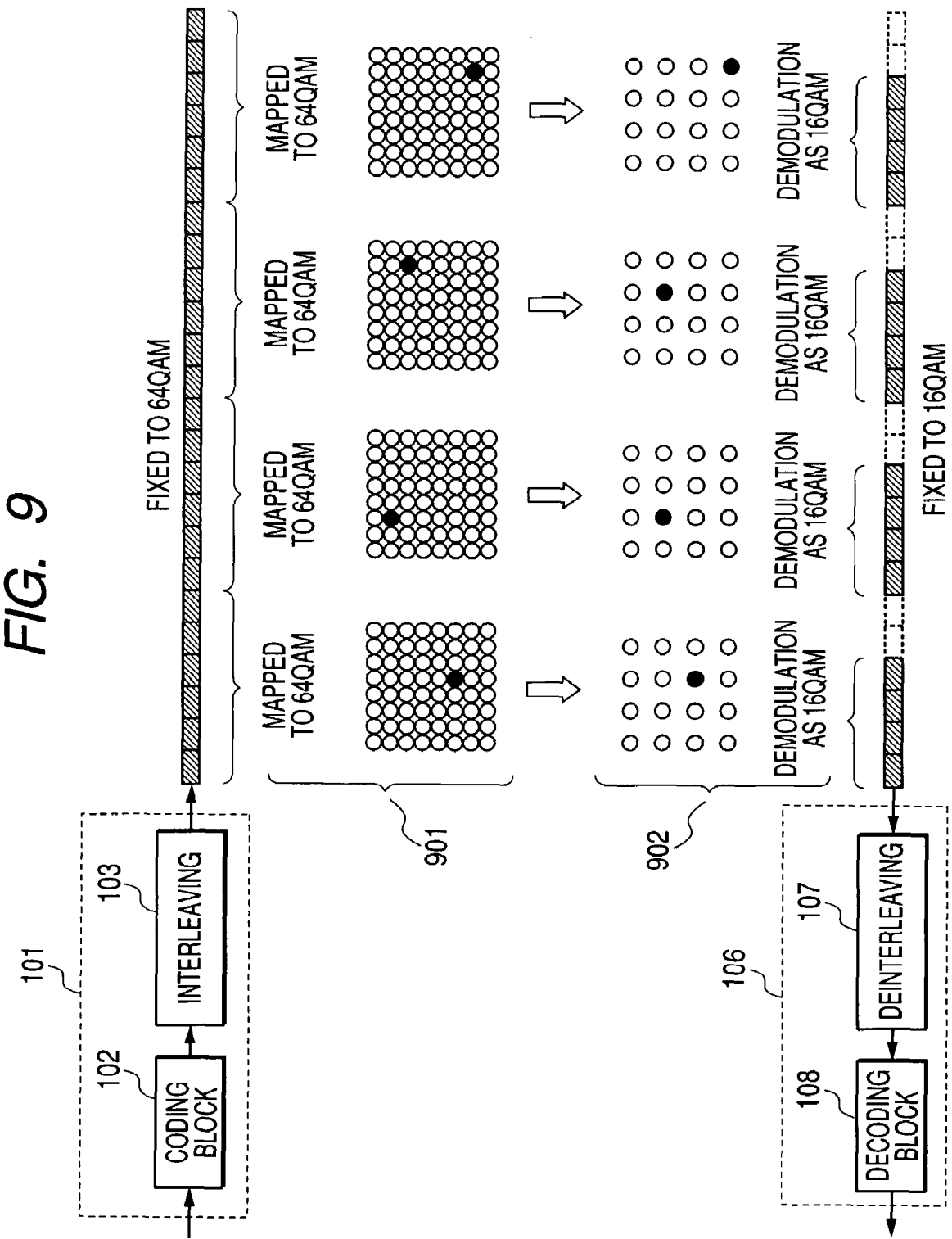
FIG. 9 shows the adaptive demodulation method in which the demodulation method of the present invention is fixed to 16 QAM.
Figure 10:
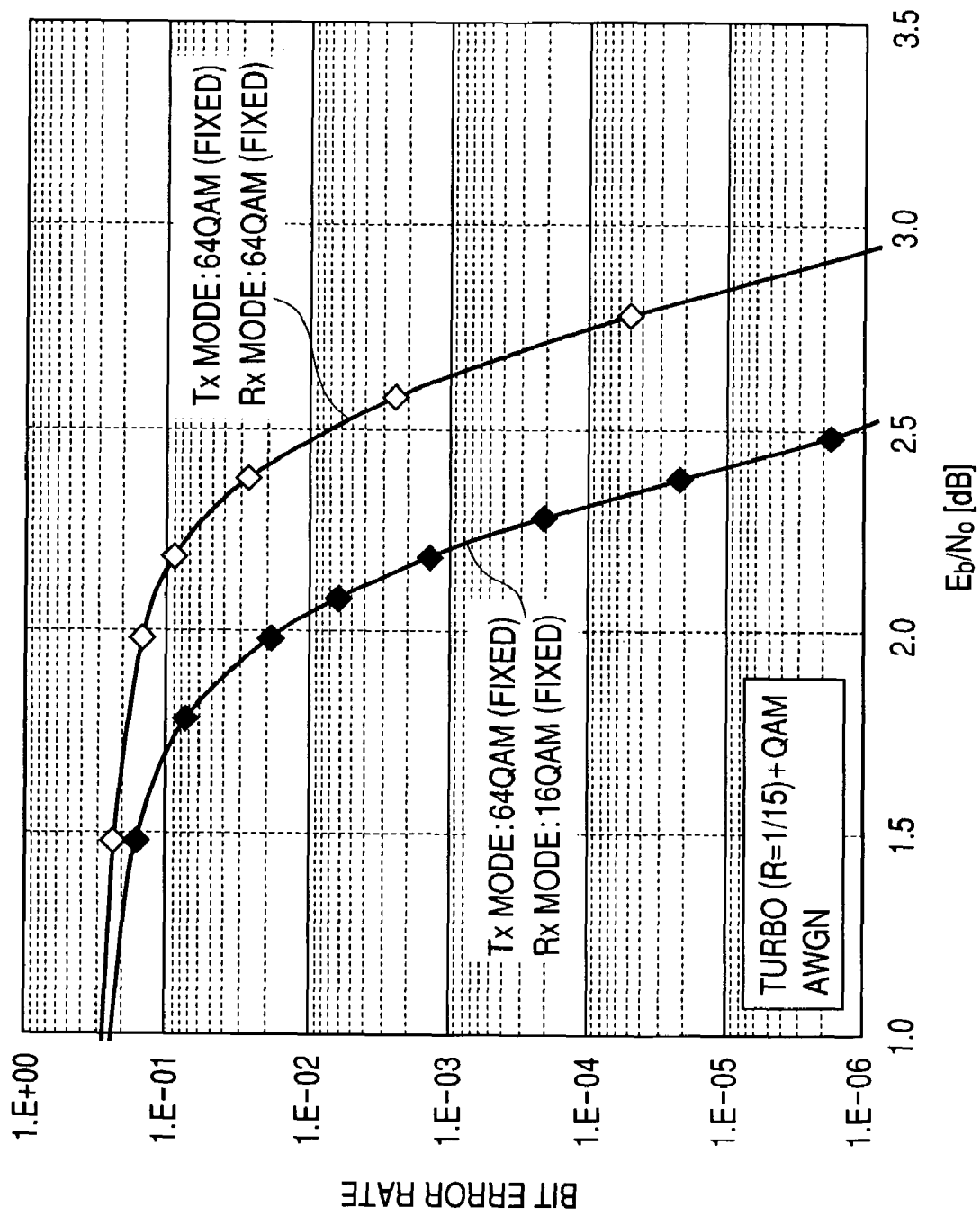
FIG. 10 shows the bit error rate performance according to the present invention.

Here, the efficiency obtained by using the present embodiment has been evaluated by using simulation. Firstly, a bit error performance has been evaluated by simulation when the modulation at the transmission device was fixed to 64 QAM (901) and the demodulation at the reception device was fixed to 16 QAM as shown in FIG. 9. The simulation result is shown in FIG. 10. FIG. 19 shows the performance when the coding by the turbo coding of coding ratio R=1/15 is combined with the multi-level modulation under the AWGN (Additive White Gaussian Noise) environment. The bit error performance of the demodulation method according to the present invention in which demodulation is performed with a demodulation multi-level number 16 QAM smaller than the modulation multi-level number is not degraded but improved in this example. The reason why the performance is improved is considered to be that the information on the least significant bit of 64 QAM is weak against the noise and accordingly in the likelihood calculation used in this evaluation, the affect by the noise is reduced by setting likelihood=0 not to give the information on the least significant bit rather than decoding by giving a likelihood information incorrect due to a noise.

Figure 11:
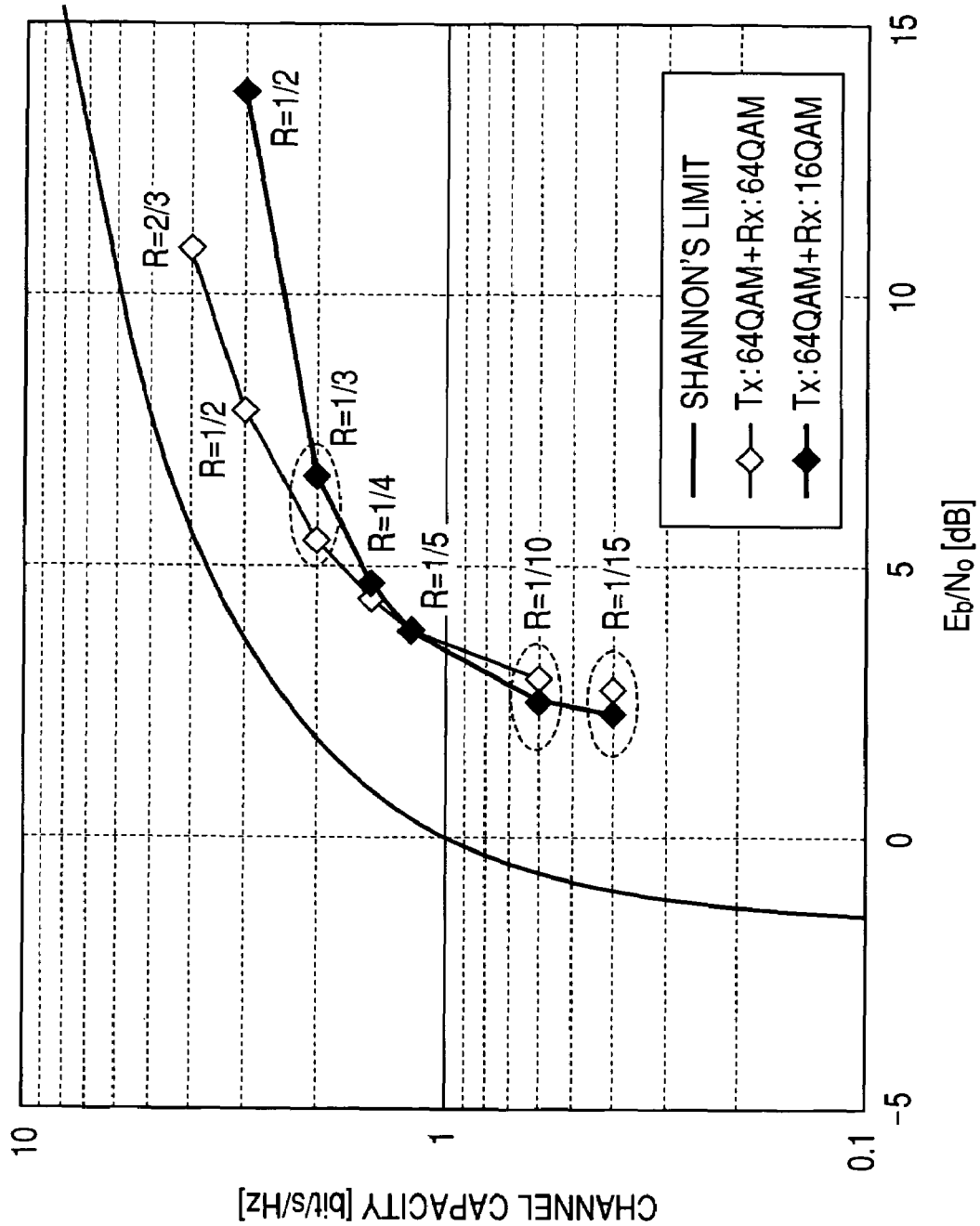
FIG. 11 shows the frequency use efficiency characteristic according to the present invention.

Next, turbo coding of another coding ratio and the performance of the demodulation method of the present invention under the same AWGN environment have been evaluated from the viewpoint of the frequency use efficiency. The evaluation result is shown in FIG. 11. In FIG. 11, the Eb/N0 value of the bit error rate=$10^{-4}$ is plotted. Like the evaluation of FIG. 10, the modulation method of the transmission side is fixed to 64 QAM and the demodulation multi-level number is demodulated as 16 QAM smaller than the modulation multi-level number. As shown in FIG. 11, in the region of coding ration<1/5, even when the signal transmitted with 64 QAM is demodulated by 16 QAM of the present invention, remedy is obtained during decoding by the redundancy by the coding and the performance is improved as compared to the conventional method which performs demodulation with 64 QAM but in the region of coding ration R>1/5, information on the transmission bit which has been transmitted but is missing cannot be saved during the process of decoding and the performance is degraded. From this, it is good that the transmission side be fixed to 64 QAM and the reception side demodulate with 16 QAM in the region of coding ratio<1/5 and 64 QAM in the region of R>1/5.

Figure 12:
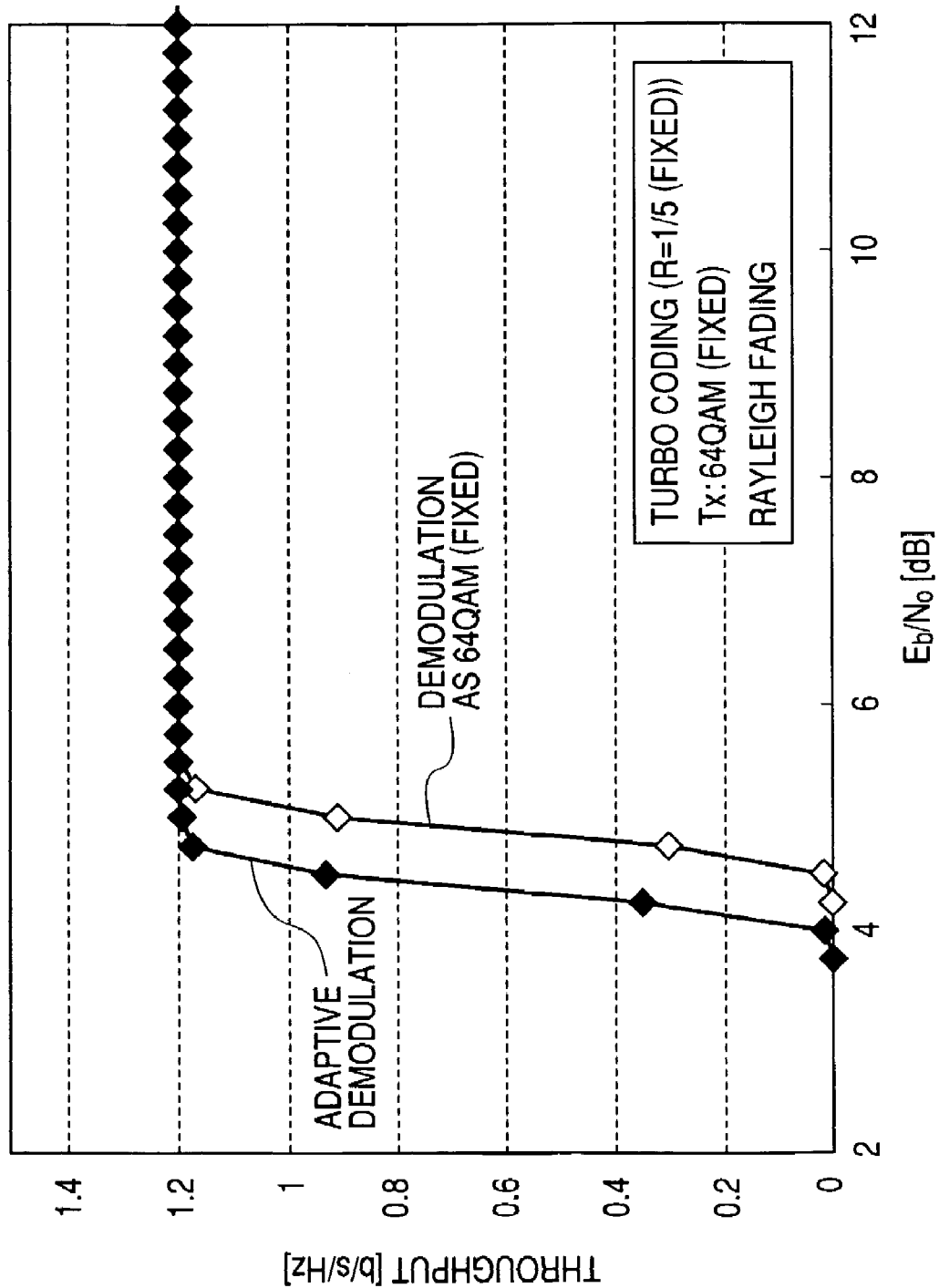
FIG. 12 shows the throughput characteristic according to the present invention.
Figure 13:
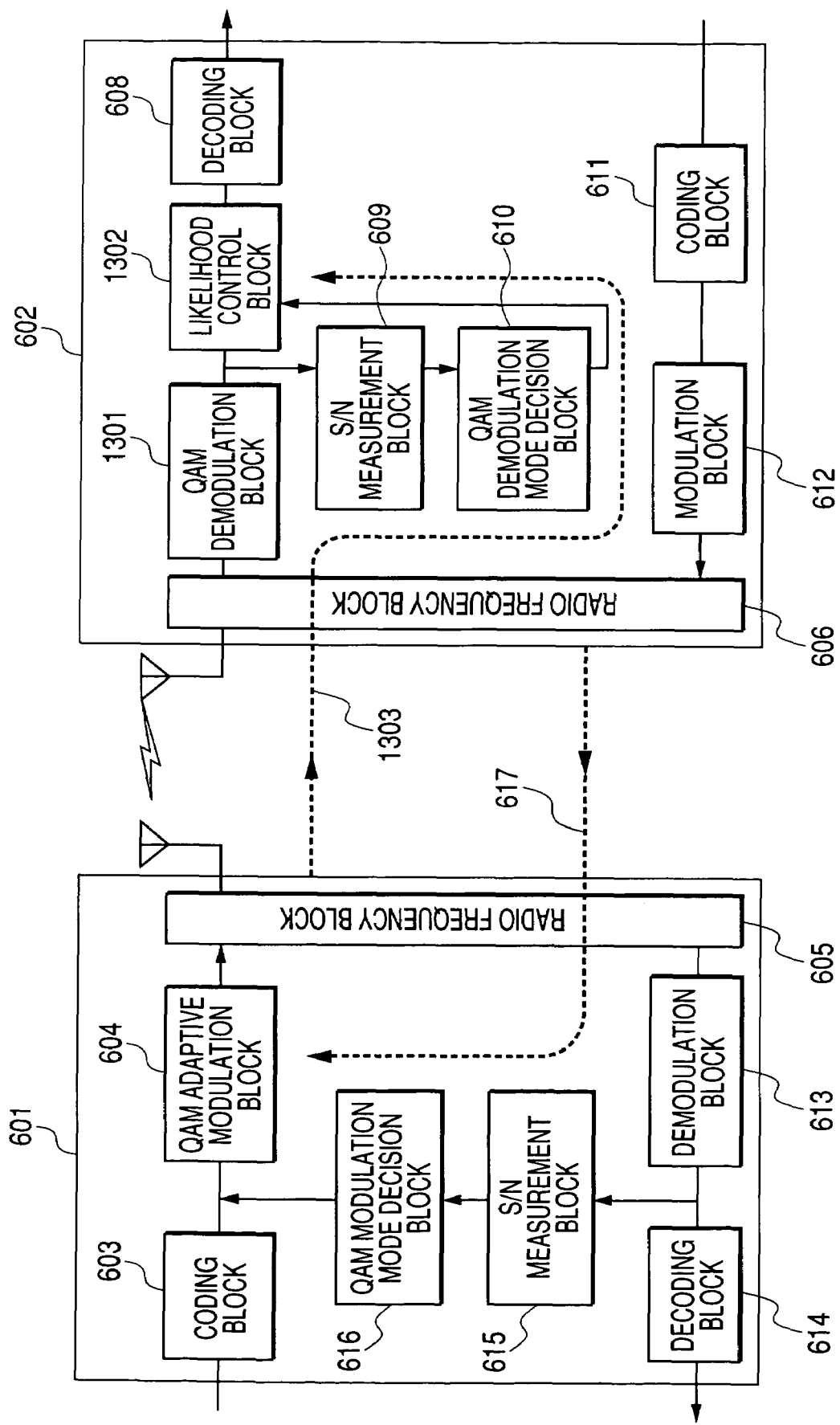
FIG. 13 shows a system configuration of the adaptive demodulation method according to the present invention.

Furthermore, the throughput characteristic under the fading environment has been evaluated. Here, modulation in the transmission device has been fixed to 64 QAM and the demodulation in the reception device has been switched to QPSK, 16 QAM, and 64 QAM according to the propagation condition. The simulation evaluation result is shown in FIG. 12. FIG. 12 shows that by controlling the demodulation multi-level number according to the propagation condition in the reception device, the throughput in the low Eb/N0 region is improved, i.e., that the present method is effective.

Description will now be directed to a fourth embodiment of the present invention. This embodiment is characterized in that the modulation multi-level number in the transmission device is decided by the flow of the signal of (617) in FIG. 6 (signal to be measured, control signal, and the like) while the demodulation multi-level number in the reception device is decided by the flow of signal of (618). That is, unlike the control loop (317) in the conventional adaptive modulation method described with reference to FIG. 3, in the system configuration of the present invention, no feedback system is constituted and each of the transmission device and the reception device independently decides the modulation multi-level number and the demodulation multi-level number. Since the modulation multi-level number and the demodulation multi-level number can be decided without constituting a feedback system, an instantaneous propagation fluctuation can also be followed. Moreover, since no feedback information is required, there is an advantage that the processing is simplified even when applying the present invention to each carrier in the communication method performing simultaneous communication by using a plurality of carriers such as the OFDM.

Description will now be directed to a fifth embodiment of the present invention. As shown in FIG. 5, the present embodiment relates to a demodulation method when the modulation multi-level number m used in the transmission device and the demodulation multi-level number n used in the reception device are small.

As has been explained in the first embodiment, FIG. 5 shows a demodulation operation when demodulating (506) by QPSK in the reception device, the signal (501) which has been modulated by 16 QAM in the transmission device. When the demodulation multi-level number n is smaller than the modulation multi-level number m, no valid likelihood information can be acquired for the least significant bit of the multi-level modulation. However, since the number of bits given to the decoding section should be aligned, likelihood information should be output and information on that likelihood is low is given.

Description will now be directed to a sixth embodiment. In this embodiment, the likelihood information on the least significant bit of the multi-level modulation in the fifth embodiment is, as shown in the example of (509) of FIG. 5, such that likelihood of "0" and the likelihood of "1" are equally low and the "likelihood=0" is input as a demodulation result to the decoder.

Description will now be directed to a seventh embodiment. In this embodiment, the likelihood information on the least significant bit of the multi-level modulation in the fifth embodiment is, as shown in the example of (509) of FIG. 5, such that likelihood of "0" and the likelihood of "1" are equally low and the "likelihood=0" is input as a demodulation result to the decoder. However, the likelihood is not limited to likelihood=0 and a value weighted by a value proportional to the propagation condition such as the demodulation signal S/N or one of a plurality of values prepared in advance according to the propagation condition is given. When the propagation condition is not good, there is a high possibility that correct reception cannot be performed due to the propagation fluctuation and the noise and accordingly the likelihood of the signal received in such a propagation condition is preferably set to a low value. On the contrary, when the propagation condition is good, there is a high possibility that correct reception can be performed without being affected by the propagation fluctuation or noise and accordingly, the likelihood of the signal received in such a propagation condition is preferably set to a high value.

Description will now be directed to an eighth embodiment of the present invention. In this embodiment, the likelihood information on the least significant bit of the multi-level modulation in the fifth embodiment is, as shown in the example of (509) of FIG. 5, such that likelihood of "0" and the likelihood of "1" are equally low and the "likelihood=0" is input as a demodulation result to the decoder. However, the likelihood is not limited to likelihood=0 and a value weighted by a value in inverse-proportional to a multi-level number selected upon demodulation or one of a plurality of values prepared in advance according to the multi-level number selected upon demodulation is given. When the multi-level number is high, there is a high possibility that correct reception cannot be performed due to the propagation fluctuation and the noise especially in the lower bit and accordingly the likelihood of the lower bit is preferably set to a low value. On the contrary, when the multi-level number is low, there is a high possibility that correct reception can be performed up to the least significant bit and the likelihood of the lower bit is preferably set to a high value.

Description will now be directed to a ninth embodiment of the present invention. In this embodiment, the QAM demodulation block (1301) in the reception device performs demodulation by using the modulation multi-level number used in the transmission device or the maximum multi-level number preset regardless of the propagation condition. After this, the demodulation multi-level number is decided according to the propagation condition (610) and the likelihood control block (1302) replaces the information on the multi-level modulation lower bit with the soft decision output result according to the likelihood control method explained in the fifth to the eighth embodiment. This is another system configuration for realizing the present invention explained in the first and the fourth embodiment. In this configuration, the QAM demodulation block (1301) can perform demodulation regardless of the propagation condition and it is possible to simply configure the QAM demodulation block.

Figure 14:
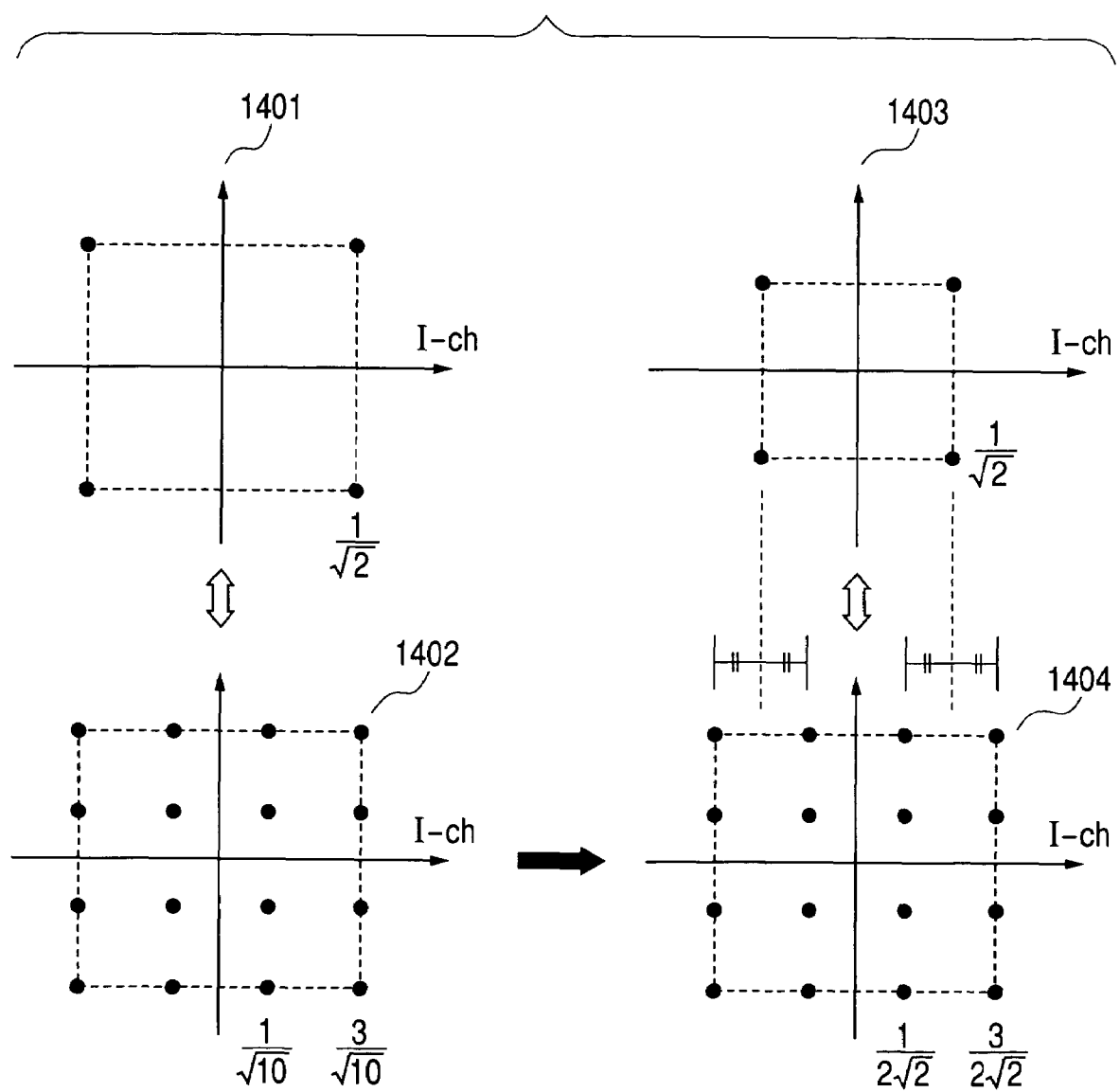
FIG. 14 shows a signal point arrangement in the transmission device according to the present invention.

Description will now be directed to a tenth embodiment of the present invention. In this embodiment, in order to simplify the QAM demodulation in the reception device, the signal power in the transmission device is modified in advance when transmitted. More specifically, as shown in FIG. 14, normally, transmission is performed so that the transmission power is constant and when the average power=1 for example, the signal point of GPSK is ±1/sqrt(2). However, the signal point arrangement of 16 QAM becomes ±1/sqrt(10) and ±3/sqrt(10). Accordingly, when the modulation multi-level number is switched at the transmission device, the signal point interval is different and the setting of a boundary value (threshold value) for correct symbol decision becomes difficult in the reception device. Here, the sqrt(x) is a number which becomes x when squared. In this embodiment, when the multi-level number is made large in the transmission device so that the symbol decision boundary value (threshold value) in the reception device is fixed, a large power is transmitted according to the multi-level number. As shown in FIG. 14, the relationship between the signal point arrangements of the QPSK and the 16 QAM is such that in the middle of the four symbols of 16 QAM of in-phase component>0 and the quadrature component>0, the QPSK symbol of the in-phase component>0 and the quadrature component>0 is arranged. Here, if the QPSK signal power is 1, the signal point arrangement of the QPSK becomes ±1/sqrt(2) as has been described above. However, the signal point arrangement of the 16 QAM becomes ±1(2×sqrt(2)) and ±3(2×sqrt(2)). By using this embodiment, the reception device can demodulate the multi-level modulation bit from the received signal regardless of the multi-level number selected upon transmission.

The transmission power is controlled according to the input from the modulation multi-level number decision block by the transmission power control block (619) of FIG. 6 for example. The modulation multi-level number decision block (616) outputs the modulation multi-level number information to the transmission power control block (619) each time when the modulation multi-level number decision is performed or the modulation multi-level number is updated.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication method in a radio communication system including a transmission device and a reception device, comprising the steps of:
   in the transmission device:
      estimating a first propagation condition regarding a propagation channel between the transmission device and the reception device,
      setting a multi-level modulation index m according to an estimation result of the first propagation condition,
      coding a transmission signal,
      multi-level-modulating the coded transmission signal with the multi-level modulation index m, and
      transmitting the modulated, coded transmission signal; and
   in the reception device:
      estimating a second propagation condition regarding the propagation channel between the reception device and the transmission device,
      setting a multi-level demodulation index n according to an estimation result of the second propagation condition, wherein n is different from the multi-level modulation index m that is used in transmission,
      receiving the signal transmitted from the transmission device,
      demodulating the reception signal received according to the second propagation condition with the multi-level demodulation index n, and
      decoding the demodulated reception signal.

2. A communication method as claimed in claim 1, wherein said multi-level demodulation index n is not greater than said multi-level modulation index m.

3. A communication method as claimed in claim 1, wherein said multi-level modulation index m is set according to the propagation condition judged upon start of communication between the transmission device and the reception device and said multi-level modulation index m is fixed to the set value during communication between the transmission device and said reception device.

4. A communication method as claimed in claim 1, wherein said second propagation condition is estimated during communication between the transmission device and the reception device and said multi-level demodulation index n is updated according to the estimation result of said second propagation condition.

5. A communication method as claimed in claim 4, wherein said multi-level modulation index m is updated according to said first propagation condition estimated during the communication.

6. A communication method as claimed in claim 5, wherein said multi-level demodulation index n is updated independently of the multi-level modulation index m.

7. A communication method as claimed in claim 1, wherein when said multi-level demodulation index n is smaller than said multi-level modulation index m, said reception device gives a likelihood 0 or a likelihood in the vicinity of 0 to a soft decision output value as a demodulation result of lower bit of a difference number between the multi-level modulation index m and the multi-level demodulation index n.

8. A communication method as claimed in claim 1, wherein said transmission device controls transmission power of the transmission signal according to said multi-level modulation index m.

9. A reception device in a radio communication system in which a transmission device transmits a signal after coding and multi-level-modulating the signal and said signal is received by the reception device which multi-level-demodulates and decodes the received signal, said reception device comprising:
an antenna for receiving the signal modulated with a multi-level modulation index m, from the transmission device,
a demodulation unit for demodulating the reception signal received, with a multi-level demodulation index n,
a decoding unit for decoding the reception signal which has been demodulated,
a propagation condition estimation unit for estimating the propagation condition to/from said transmission device, and
a multi-level demodulation index decision unit for judging the multi-level demodulation index n, which is different in value from said multi-level modulation index m, according to the propagation condition estimated.

10. A reception device as claimed in claim 9, wherein said propagation condition estimation unit estimates the propagation condition to/from the transmission device according to the signal received from the transmission device.

11. A reception device as claimed in claim 9, wherein the propagation condition estimation unit estimates the propagation condition when starting communication with the transmission device or during the communication and the multi-level modulation index decision unit updates the multi-level modulation index n according to the propagation condition estimated.

12. A reception device as claimed in claim 9, wherein said decoding unit performs decoding by assuming the multi-level demodulation index of the reception signal to be m (m>n) and said demodulation unit gives a likelihood 0 or a likelihood in the vicinity of 0 to the soft decision output value as a demodulation result of lower bit equivalent to a difference between the bit numbers of multi-level modulation index m and the multi-level demodulation index n.

13. A reception device as claimed in claim 9, wherein said multi-level demodulation index decision unit judges the multi-level demodulation index n by using the multi-level modulation index m in the transmission device reported from the transmission device.

14. A reception device as claimed in claim 9, wherein said propagation condition estimation unit estimates the propagation condition by using the S/N ratio, the BER, the C/I ratio, or the Eb/NO value of the signal received from the transmission device.

* * * * *